United States Patent [19]

Rueckl

[11] Patent Number: 4,596,601
[45] Date of Patent: Jun. 24, 1986

[54] HIGH STRENGTH COKE-OVEN MORTAR

[75] Inventor: Roger L. Rueckl, Murrysville, Pa.

[73] Assignee: United States Steel Corporation, Pittsburgh, Pa.

[21] Appl. No.: 677,422

[22] Filed: Dec. 3, 1984

[51] Int. Cl.$^4$ .................. B28B 7/36; C03C 3/097
[52] U.S. Cl. .................. 106/38.27; 106/38.3; 106/38.9; 501/63; 501/69
[58] Field of Search .................. 501/63, 68, 69, 100, 501/127, 128, 133; 264/30; 106/38.3, 38.27, 38.9

[56] References Cited

U.S. PATENT DOCUMENTS

| | | | |
|---|---|---|---|
| 3,445,252 | 5/1969 | MacDowell | 501/68 |
| 3,547,670 | 12/1970 | Fuchs et al. | 106/38.3 |
| 3,649,313 | 3/1972 | Fisher | 501/100 |
| 3,813,225 | 5/1974 | Cook | 264/30 |
| 4,090,881 | 5/1978 | Keel et al. | 501/129 |
| 4,098,725 | 7/1978 | Yamamoto et al. | 252/514 |
| 4,446,082 | 5/1984 | Harvey et al. | 264/30 |
| 4,533,644 | 8/1985 | Jones | 501/127 |

FOREIGN PATENT DOCUMENTS

0020924  5/1974  Japan .................. 501/68

OTHER PUBLICATIONS

Chem. Abst., 84:64622w; Ivarsson, May 71.

*Primary Examiner*—Theodore Morris
*Attorney, Agent, or Firm*—Arthur J. Greif

[57] ABSTRACT

A high strength mortar has been developed for use with silica brick, in the construction of coke-oven heating walls. When fired to conventional coke oven temperatures of about 1100° C., the mortar develops a tensile strength within the mortar itself, and a tensile bond to the silica brick, which exceeds the tensile strength of the silica brick. The mortar is composed of three primary solid constituents: 25 to 88 percent $SiO_2$, 6 to 65 percent $Al_2O_3$ and 4 to 12 percent $P_2O_5$. To achieve such high tensile strength, the other solid constituents must be maintained at a minimum, desirably less than four percent and preferably less than two percent. Use of the high strength mortar permits construction of coke oven walls which can withstand significantly increased coking pressures—resulting in two significant benefits; (i) productivity increases of the order of 10 to 15 percent and (ii) doubling the service life of a coke oven wall.

6 Claims, No Drawings

HIGH STRENGTH COKE-OVEN MORTAR

This invention relates to the construction of coke-oven heating walls and is more particularly related to the use of a mortar which provides high tensile strength bonding with the silica brick utilized in the construction of coke oven heating walls.

In an attempt to increase the rate of the production of coke, the art has resorted to (i) the use of coke-ovens with heights exceeding 16 feet, (ii) the selection of coal blends which provide higher bulk densities and (iii) the use of faster coking rates—all of which lead to increased coking pressures. Such increased coking pressures result in flexure of the coke-oven wall which, in turn, results in stress concentrations in the refractory shapes and ultimately the failure of the refactories and loss of wall integrity. It has been found that the wall's inability to resist such increased pressure is, in large part, due to the fact that (a) existing mortars do not develop sufficient tensile bond strength to the brick and (b) such existing mortars acquire, during service, high compression and shear strengths which decrease the ability of the mortar to yield and thereby relieve stresses caused by wall flexure. These limitations of such currently available materials of construction (i.e. silica brick and silica coke-oven mortar) result in severe operating limits and reduced coke battery throughput.

A new high strength mortar has been developed for coke battery construction which; (1) develops a tensile bond strength within itself and to the surface of the silica brick to which it bonds, that is at least equivalent to the tensile strength of the silica brick itself under actual coking conditions, (2) as a result of its high strength bond, is resistant to deformation under load, but nevertheless is capable of yielding under stresses that exceed the normal static stress of the battery and (3) is capable of being mixed to a consistency that permits its use in construction procedures conventionally used to install refactories in a coke oven heating walls. Because of its enhanced tensile properties, it is estimated that use of the inventive mortar can provide productivity increases of from 10 to 15 percent, per coke oven. Thus, while the new mortar composition is more costly to supply (than conventional coke-oven silica mortar) such increased purchase cost is more than offset by savings of: (a) the added capital cost for the construction of additional ovens (i.e. 10 to 15 percent additional ovens) required to match the capacity of a coke oven battery constructed with the inventive mortar and (b) future capital requirements resulting from an anticipated service life of about 30 years, compared with the average life of less than 15 years provided by silica coke-oven mortar.

These and other advantages of the instant invention will become more apparent from the following detailed description when read in conjunction with the appended claims.

As previously noted, the principal design parameter for the instant mortar is that it develop a tensile bond strength, both within its mass and to the brick surfaces to which it is applied, which (at battery operating temperatures) approximately equals or exceeds that of the silica brick. Silica brick has a tensile strength of about 190 psi at 1100° C. and 90 psi at 1350° C. These criteria are provided by a silica base, aluminum bearing, phosphate-bonded mortar in which impurities are maintained at a minimum level, desireably below 4 percent and preferably below 2 percent. The primary constituent, for the production for the mortar, can be supplied by either the crystalline or amorphous form of silica. If the crystalline form is used, the high temperature forms crystobalite or tridymite are preferred over the lower temperature quartz form, so as to avoid the possibility of volume changes resulting from phase transformation. Since it is desired to maintain impurities to a minimum, amorphous or fused silica is preferred over the crystalline form, since the former is of generally of higher purity and is more readily commercially available. The alumina can be supplied from any high purity source, such as tabular $Al_2O_3$. The phosphate bond can be developed through the use of phosphoric acid, but the $P_2O_5$ is preferably provided by a commercially available bonding agent such as colloidal monoaluminum phosphate (MAP).

The sizing of the silica and alumina should be controlled so that: (1) the mortar has a workable and trowelable consistency, (2) the blend of the constituents result in a homogenous mixing, and (3) the cured mortar has minimum apparent porosity and maximum bulk density. It is desirable that the granular materials be finer than 40 U.S. Standard mesh (420$\mu$) and preferably finer than 70 mesh (210$\mu$) for workability, and to gap size the granular material, that is use a coarser fraction, such as 70–100 mesh (210$\mu$–149$\mu$), and a finer fraction, such as finer than 200 mesh ($<74\mu$) to minimize apparent porosity and to maximize bulk density. The alumina will generally be of a size finer than the silica to achieve chemical homogeneity. If a MAP solution is used, the mortar would be supplied wet and ready to use; a dry phosphate binder such as MAP or hexaphos can be used, in which case the mortar would have to be mixed with water. This would generally be less desirable than premixed mortar, because of the potential for mixing errors which, in turn, could adversely affect mortar strength.

The composition of the cured and dried mortar on a water-free basis will be within the range 25 to 88 percent $SiO_2$, 6 to 65 percent $Al_2O_3$, and 4 to 12 percent $P_2O_5$ with total other constituents being less than 4 percent. Within this compositional range, tensile strength is affected both by silica-alumina ratio and by phosphate content. In general, strength will increase with decreasing $SiO_2/Al_2O_3$ ratios. For example, at a $P_2O_5$ content of 9.3%, a tensile strength greater than 200 psi at 1100° C. can be achieved when $SiO_2/Al_2O_3 \leq 4$ - with strength further increasing until $SiO_2/Al_2O_3$ is reduced to about 2. Further decreases in the $SiO_2/Al_2O_3$ ratio cause a slight decrease in strength, although it remained above 200 psi (for a $P_2O_5$ content of 9.3%) at ratios as low as 0.4. Similarly, strength markedly increases as $P_2O_5$ content is decreased for 12% down to 8%. However, further decreases in $P_2O_5$ result in a rapid decrease in strength. To maximize tensile bond strength and resistance to deformation under load, the preferred range will therefore be (on a water-free basis) 60 to 70 percent $SiO_2$, 25 to 35 percent $Al_2O_3$, and 7 to 11 percent $P_2O_5$ (more preferably 8 to 10%) with total other solid constituents being less than 2 percent.

As a specific example of this invention, 52.5 percent by weight fused silica grain (31.5 percent minus 150 mesh and 21.0 percent minus 50, plus 100 mesh), 20.6 percent by weight minus 100-mesh tabular alumina, 23.1 percent by weight colloidal monoaluminum phosphate (8.0 percent $Al_2O_3$, and 30 percent $P_2O_5$), and 3.8 percent by weight water were blended into a workable mortar. When fired to 2000° F., this mortar develops a tensile bond to silica brick and within itself that exceeds the tensile strength of the silica brick. The apparent porosity of a trowelbed joint fired to 2000° F. is less than 30 percent. The composition of the fired mortar is 64.1 percent $SiO_2$, 27.4 percent $Al_2O_3$, and 8.5 percent $P_2O_5$.

I claim:

1. A mortar, consisting essentially of (a) on a dry basis, 25 to 88 percent $SiO_2$, 6 to 65 percent $Al_2O_3$, 4 to 12 percent $P_2O_5$, not more than 4 percent other solid constituents and (b) sufficient liquid to provide the requisite workable consistency to such mortar.

2. The mortar of claim 1, wherein $SiO_2$ is 60 to 70 percent, $Al_2O_3$ is 25 to 35 percent, $P_2O_5$ is 7 to 11 percent and the other solid constituents not more than two percent.

3. The mortar of claim 2, wherein the $P_2O_5$ is 8 to 10 percent.

4. The mortar of claim 1, wherein at least a major portion of the $P_2O_5$ is provided in colloidal form.

5. The mortar of claim 2, wherein substantially all the solid constituents are finer than 420 microns.

6. In the construction of coke-oven walls wherein a monolithic heating wall is formed my the mortaring together of a multitude of silica bricks, the improvement for increasing the ability of such wall liners to withstand high coking pressures which comprises, utilizing a mortar consisting essentially of (a) on a dry basis, 25 to 88 percent $SiO_2$, 6 to 65 percent $Al_2O_3$, 4 to 12 percent $P_2O_5$, not more than 4 percent other solid constituents and (b) sufficient liquid to provide the requisite workable consistency to such mortar.

* * * * *